July 30, 1963  R. G. SHEEHAN  3,099,460
THREE-AXLE VEHICLE SUSPENSION INCLUDING
LOAD STABILIZING MEANS
Filed Nov. 3, 1960  3 Sheets-Sheet 1

INVENTOR.
ROBERT G. SHEEHAN
BY
Fred C. Matheny
ATTORNEY $A = \tfrac{2}{3} B$

*INVENTOR.*
ROBERT G. SHEEHAN
BY
Fred C. Matheny
*ATTORNEY*

July 30, 1963  R. G. SHEEHAN  3,099,460
THREE-AXLE VEHICLE SUSPENSION INCLUDING
LOAD STABILIZING MEANS
Filed Nov. 3, 1960  3 Sheets-Sheet 3
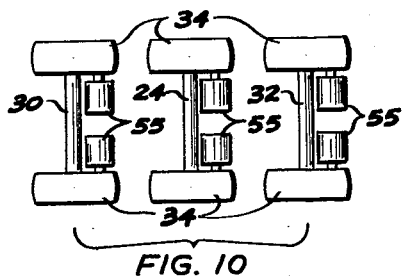
FIG. 10
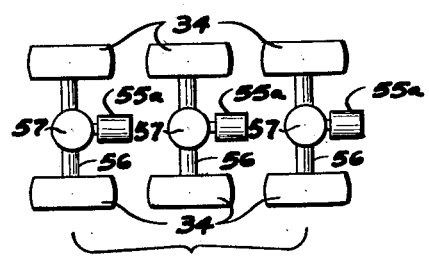
FIG. 11
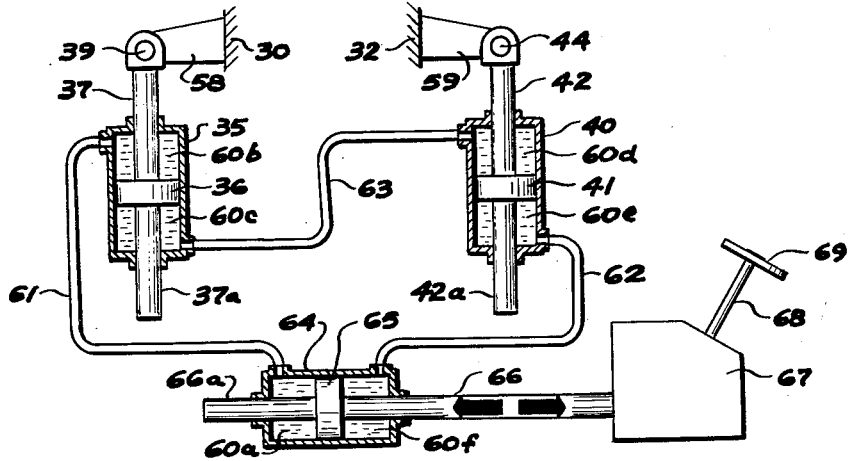
FIG. 12
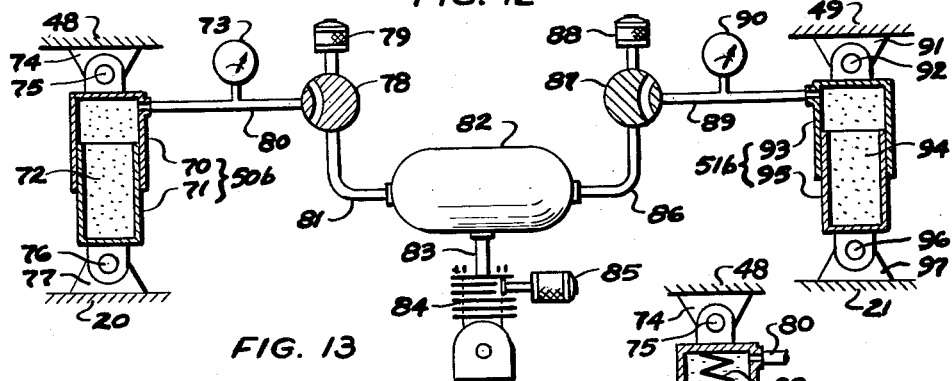
FIG. 13
FIG. 14
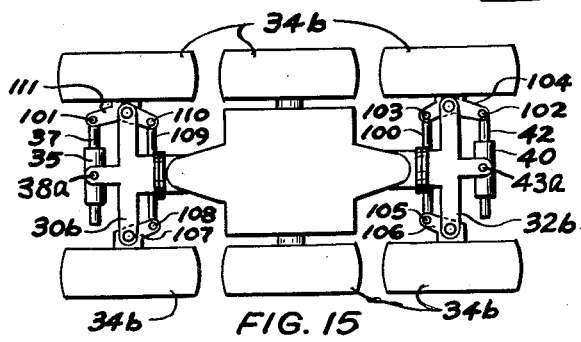
FIG. 15
INVENTOR.
ROBERT G. SHEEHAN
BY
Fred C Matheny
ATTORNEY

United States Patent Office 3,099,460
Patented July 30, 1963

3,099,460
THREE-AXLE VEHICLE SUSPENSION INCLUDING LOAD STABILIZING MEANS
Robert G. Sheehan, 1244 165th Ave. SE., Bellevue, Wash.
Filed Nov. 3, 1960, Ser. No. 67,043
5 Claims. (Cl. 280—104.5)

My invention relates to a three-axle vehicle suspension.

A fundamental object of my invention is the realization of improved wheeled-vehicle mobility over irregular terrain, soft soil, snow and natural ground obstacles common in off-highway operations. The principles employed in the attainment of this goal are as follows; low ground pressure for purposes of reducing wheel sinkage, close spacing of wheels to gain, in so far as practical, the soil bridging effect ordinarily characteristic only of tracked vehicles, pure rolling steering to avoid the introduction of undesirable vehicle restraining forces during turning, the uniform distribution of load among wheels, the utilization of all wheels for driving traction, and the universal flexure of the vehicle suspension in a fashion which maintains tractive contact of all wheels with the ground even over major ground irregularities.

Heretofore two axle vehicles have been unable to fully utilize these principles of mobility in land locomotion because of their inherent limitation of ground contact area, and vehicles having a greater number of axles have been deficient in means of implementing various of the other principles of vehicle mobility. My invention specifically utilizes all of these fundamental principles in a vehicle having three axles and which, therefrom, his fifty percent greater ground contact area than any two axle machine and which is significantly superior to any three axle vehicle in other respects.

A further object of my invention is to provide a vehicle suspension which embodies a longitudinally extending centrally positioned articulated frame having three transverse axles, each of which is coincident with the longitudinal axis of the frame part or parts with which it is connected.

Another object is to provide a three-axle vehicle suspension which eliminates tire scuffing and vehicle drag characteristic of conventional three-axle steering by providing for synchronized steering movement of a front axle and a rear axle about a common center which coincides geometrically with the projected axis of an intermediate axle, thereby providing pure rolling contact of all wheels about the common center of intersection of the axes of the three axles.

Another object is to provide a three-axle steering arrangement which permits pure rolling steering movement of the wheels without any tire scuffing or drag when the vehicle is static and not in motion.

Another object is to provide a three-axle vehicle suspension employing two interhinged yokes hung from a common axis on an intermediate or center axle and having front and rear axles respectively torsionally supported by swivel joints from the forward end of the front yoke and the rearward end of the rear yoke affording independent torsional or vertical oscillatory movement of each of said axles and thereby making it possible to maintain ground contact and traction of all wheels on said axles as they move over obstacles and surfaces of irregular contour.

Another object is to provide a three-axle vehicle including a centrally positioned longitudinally extending vehicle frame formed in part of two yokes having adjoining inner ends pivotally connected by and with a transverse intermediate axle and having a front axle and a rear axle torsionally connected with their respective outer ends and a longitudinally extending load supporting deck spaced above the yokes and the intermediate axle and pivotally connected with the intermediate axle, said load supporting deck having spring suspension means interposed between its front end portion and its rear end portion and the respective yokes, said spring suspension means stabilizing the load carrying deck and equalizing the load on the three axles of the vehicle.

Other objects of this invention will be apparent from the following description and accompanying drawings.

In the drawings FIGURE 1 is a somewhat diagrammatic top plan view of a three-axle vehicle constructed in accordance with my invention.

FIG. 10 is a diagrammatic plan view illustrative of the application of a variable-speed motor to each wheel of the vehicle for driving purposes.

FIG. 11 is a view similar to FIG. 10 illustrating driving means of modified form in which the two wheels of each pair are connected by way of differential gear means with a variable-speed driving motor.

FIG. 12 is a somewhat diagrammatic view showing hydraulic steering apparatus which can be used in connection with this vehicle.

FIG. 13 is a somewhat diagrammatic view showing adjustable pneumatic spring means capable of being used on this vehicle.

FIG. 14 is a detached sectional view showing a combined mechanical and pneumatic spring.

FIG. 15 is a somewhat diagrammatic plan view illustrating an application of conventional automotive knuckle-joint steering to this vehicle.

Like reference numerals refer to like parts throughout the several views.

Figure 3:
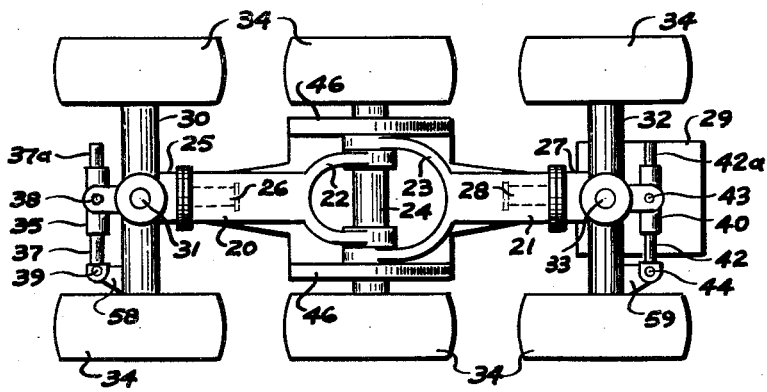
FIG. 3 is a bottom plan view of the same.

This vehicle comprises a longitudinally extending centrally positioned main frame or strongback formed in part of a rear yoke 20 and a front yoke 21. The inner ends of the yokes 20 and 21 are provided respectively with interfitting forked portions 22 and 23, FIG. 3. A medially disposed intermediate axle 24 pivotally connects these interfitting forked portions 22 and 23 so that each yoke 20 and 21 is pivotally connected with the intermediate axle 24 for vertical swinging movement or oscillation.

A rear axle bracket 25 is rotatively connected by suitable swivel joint bearing means 26 with the outer or rear end of the yoke 20 so that said bracket 25 is torsionally movable coaxially of said yoke 20. A similar front axle bracket 27 is rotatively connected by swivel joint bearing means 28 with the forward end of the front yoke 21 so that said bracket 27 is torsionally movable coaxially of said yoke 21. Preferably a cab 29 is mounted on the front end portion of the vehicle. I show this cab 29 to be attached to the front axle bracket 27.

A rear axle 30 is connected by a vertical pivot member 31 with the rear axle bracket 25, the pivot member 31 being mid-way between the two ends of the axle 30. A front axle 32 is connected by a vertical pivot member 33 with the front axle bracket 27, the pivot member 33 being positioned mid-way between the two ends of the front axle 32. A suitable wheel 34 is mounted on each end portion of each axle 24, 30 and 32.

Figure 4:
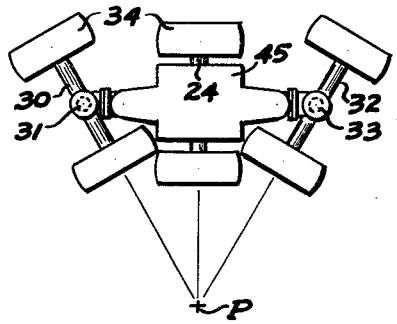
FIG. 4 is a somewhat diagrammatic top plan view, on a smaller scale than the preceding figures and with parts of the steering mechanism omitted, illustrating the steering geometry of this vehicle.

FIG. 4 is illustrative of the steering geometry of this three-axle vehicle. The front axle 32 and the rear axle 30 are mounted on medially positioned vertical pivot members 33 and 31 respectively and these axles are controlled and angularly moved for steering purposes by synchronized steering means which always impart equal angular steering movement to the front and rear axles 32 and 30. When all of the axles 24, 30 and 32 are horizontal and the front and rear axles 32 and 30 are inclined for steering purposes the projected axes of all of said axles will always intersect at a common point, which may be the point P of FIG. 4. This provides synchronized front and rear axle steering arranged geometrically so that there will always be pure rolling contact of all wheels with the ground as the vehicle moves about the common point. Also when the vehicle is static, steering can be accomplished with pure rolling since the wheels then roll about the vertical pivots 31 and 33 of the axles 30 and 32. Static steering forces are thus minimized.

A load carrying deck is positioned above the frame yokes 20 and 21. This is deck 45 and it extends longitudinally of the vehicle. The deck 45 has downwardly extending side flanges 46 and the intermediate axle 24 extends through suitable bearing openings in these side flanges. Thus the deck 45 is pivotally connected with the intermediate axle 24. A motor or prime mover 47 can be mounted between the side flanges 46 and below the top plane of the load carrying deck 45. The motor 47 is preferably used to provide either hydraulic fluid under pressure or electric current for driving purposes, as hereinafter explained. The deck 45 has two rigid extensions 48 and 49 which extend rearwardly and forwardly therefrom in spaced relation above the respective yokes 20 and 21.

Figure 7:
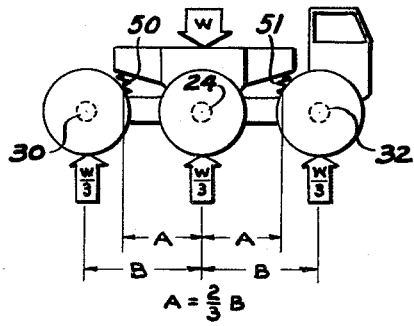
FIG. 7 is another diagrammatic side view illustrative of a preferred arrangement of the spring suspension means.

Suitable spring suspension devices 50 and 51 are provided between the extension members 48 and 49 and the respective yokes 20 and 21. These spring devices can be compression springs, as diagrammatically illustrated in FIGS. 1, 2 and 7, or they can be other types of springs or torsion bars, or resilient pneumatic devices or combinations thereof, as illustrated in FIGS. 13 and 14 and hereinafter described. By using a spring suspension of this type and by making the distance between the center of each spring 50 and 51 and the intermediate axle 24 equal to two thirds of the distance between the intermediate axle 24 and the end axle 30 or 32 adjacent said spring and by adjusting the spring forces of springs 50 and 51 to values of W/2 each, then a load W on the deck 45 which has its center of gravity directly over the intermediate axle 24, will be equally distributed to each of the three axles 24, 30 and 32. Thus, as illustrated in FIG. 7, an equal amount W/3 of the entire weight or load W will be borne by each axle 24, 30 and 32 when the weight or load W is centered over the intermediate axle 24 and distance A equals ⅔ of distance B and spring devices 50 and 51 are adjusted to provide spring forces equal to W/2. Springs which can be adjusted to provide the desired spring forces are illustrated in FIGS. 13 and 14, and hereinafter described.

Figure 9:
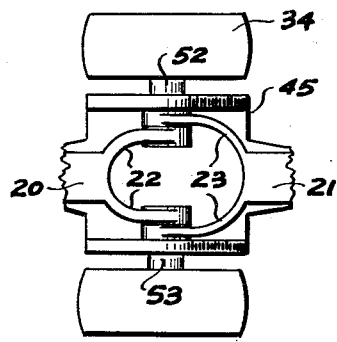
FIG. 9 is a fragmentary bottom plan view illustrative of an intermediate axle structure of modified form.

FIG. 9 shows intermediate axle means of modified form in which two intermediate axle members 52 and 53 are used. Each axle member 52 and 53 is preferably rigid with the forked end portion 22 or 23 of one of the yokes 20 or 21 and has the forked end portion of the other yoke pivotally mounted thereon. The use of two axle members 52 and 53, as shown in FIG. 9, leaves the space between the interfitting forked ends of the yokes 20 and 21 unobstructed.

Figure 5:
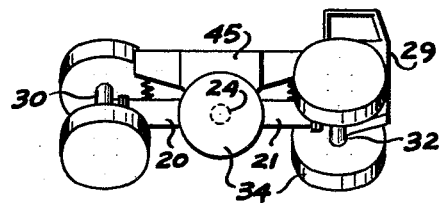
FIG. 5 is a diagrammatic side view illustrating the torsional independence of movement of the three axles relative to each other, whereby firm ground contact of all wheels on said axles is always maintained.
Figure 6:
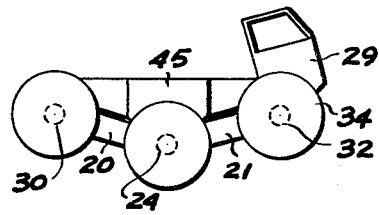
FIG. 6 is another diagrammatic side view illustrating vertical independenc of movement of the three axles and the wheels thereon.

FIGS. 5 and 6 are illustrative of the flexibility of this three-axle vehicle on uneven terrain. FIG. 5 shows the front axle 32 tilted in one direction, the rear axle 30 tilted in an opposite direction and the intermediate axle 24 substantially horizontal. This condition can obtain on bumpy and rutted surfaces without any of the six wheels losing contact or traction with the ground and without excessive strain on any part of the vehicle. FIG. 6 illustrates a condition in which all axles are horizontal and the medial axle 24 is dropped below the level of the front and rear axles 32 and 30. This condition can obtain in crossing a ditch without any of the wheels losing driving contact with the ground. A similar but opposite action occurs in negotiating an upwardly protruding obstacle.

Figure 8:
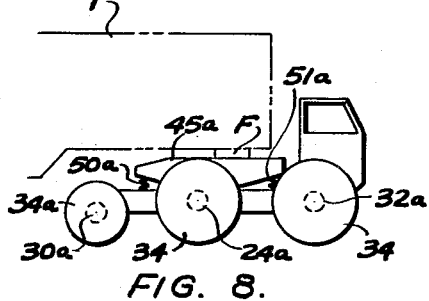
FIG. 8 is a diagrammatic side view showing wheel and load carrying deck and spring suspension means of modified form and showing, by dot and dash lines, a trailer connected with this vehicle.

FIG. 8 illustrates an embodiment of my invention in which the front end portion of a trailer T, shown by dot and dash lines, is connected by suitable fifth wheel mechanism F with a load carrying deck 45a. The fifth wheel mechanism F is not shown in detail but such mechanism is well known in the trailer art. In the FIG. 8 illustration of the deck 45a is of reduced height and the rear trailer wheels 34a are smaller in diameter than are the intermediate and front wheels 34, thereby making it possible to keep the center of gravity of the load low and still have ample clearance over the wheels 34a for the trailer T. Also preferably in the embodiment shown in FIG. 8, the fifth wheel F is positioned forwardly of an intermediate axle 24a, the extension of deck 45 to the rear of the intermediate axle 24a is shortened to provide more longitudinal clearance for the trailer T and spring suspension means 50a which supports the rear end portion of the deck 45a is positioned about mid-way between the intermediate axle 24a and a rear axle 30a. Another spring suspension means 51a which supports the forward extension of the deck 45a is positioned closer to a front axle 32a than to the intermediate axle 24a. Thus less than one third of the load on the deck 45a is placed on the smaller rear wheels 34a.

FIG. 10 diagrammatically shows driving apparatus of a preferred form which may be used in connection with this vehicle. This driving apparatus comprises an independent variable-speed motor 55 having a driving connection with each wheel 34 of the vehicle. The motors 55 can be either hydraulic or electric and the energizing medium for these motors is furnished by the prime mover 47. The means for controlling the supply of energy to these motors is conventional and is not herein shown or described.

FIG. 11 illustrates driving means of modified form in which each set of wheels is mounted on a conventional motor vehicle driving axle 56 having the usual differential gear means 57. In this form of the invention a variable-speed driving motor 55a has a driving connection with each differential gear means 57. This provides an independent motor for each pair of wheels.

Hydraulically operated steering apparatus which can be applied to this vehicle for steering the same is shown in FIGS. 1, 2, 3 and 12. This steering apparatus comprises hydraulically interconnected rear axle and front axle steering means. The rear axle steering means includes a rear axle steering cylinder 35 pivotally secured to the rear axle bracket 25 by pivot means 38 and having therein a piston 36 which is attached to a piston rod 37 and divides said cylinder 35 into two chambers 60b and 60c. One end portion of the piston rod 37 protrudes from an end of the cylinder 35 and is pivotally connected by an eye pin 39 with a rear axle steering arm 58. The arm 58 is rigid with the axle 30. The other end portion 37a of the piston rod extends through the other end of the cylinder 35 so that the two parts 37 and 37a provide space for a constant volume of liquid in the cylinder 35 at all times and irrespective of their movement.

The front axle steering means is similar to the rear axle steering means, just described, and includes a front steering cylinder 40 connected with the front axle bracket 27 by pivot means 43 and having therein a piston 41 which divides said cylinder 40 into two chambers 60d and 60e. The piston 41 is connected by a piston rod 42 and eye pin 44 with a front axle steering arm 59. The arm 59 is rigid with the front axle 32. A piston rod part 42a is rigid with the piston 41 and protrudes from the end of the cylinder 40 opposite to piston rod 42 for volumetric compensation purposes.

A conduit 63 connects the chamber 60c of the rear axle steering cylinder 35 with the chamber 60d of the front axle steering cylinder 40. The two steering cylinders 35 and 40 are controlled by a master cylinder 64 having therein a piston 65 which divides it into two chambers 60a and 60f. The chamber 60b of the rear axle steering cylinder 35 is connected by a conduit 61 with the chamber 60a in one end portion of the master cylinder 64. The chamber 60e of the front axle steering cylinder 40 is connected by a conduit 62 with the chamber 60f in the other end portion of the master cylinder 64. The piston 65 in the master cylinder 64 is connected by a piston rod 66 with suitable mechanism within a housing 67 by which it can be moved longitudinally by turning a steering post 68 which has a steering wheel 69 thereon. Obviously direct or power steering may be employed. A rearwardly extending piston rod member 66a is secured to the piston 65 for volumetric compensation purposes. Incompressible fluid is used in the cylinders and conduits of the hydraulic circuit and completely fills these cylinders and conduits at all times.

In the operation of this steering apparatus, when the master cylinder piston 65 is actuated to the left, FIG. 12, fluid is forced from chamber 60a through conduit 61 to chamber 60b of rear axle steering cylinder 35. This moves the piston 36 and displaces, under pressure, an identical volume of liquid in chamber 60c, which travels through conduit 63 to chamber 60d in the opposite end of the front axle steering cylinder 40. This actuates piston 41 in forced synchronism with piston 36 and displaces an equal volume of liquid from chamber 60e to chamber 60f by way of conduit 62. The two steering cylinders 35 and 40 and pistons and piston rods therein are of identical dimensions and movement of the piston 65 in the master cylinder 64 will always impart equal angular steering movement to the rear axle 30 and front axle 32.

Figure 1:
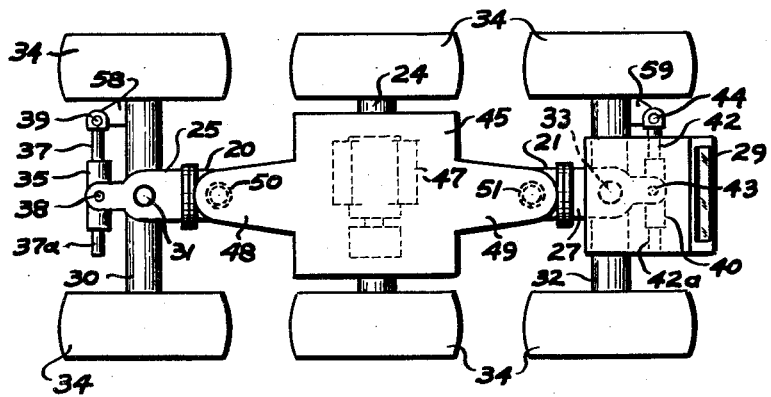
Figure 2:
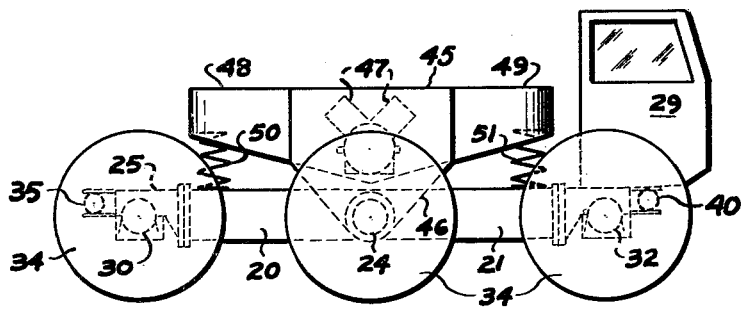
FIG. 2 is a side elevation of the same.

FIGS. 13 and 14 are illustrative of pneumatic spring devices which may be used in place of the mechanical springs shown in FIGS. 1, 2 and 8 and hereinbefore described, or in combination with mechanical springs of this type. These adjustable pneumatic springs are adapted for use on vehicles whereon the weight of the load is liable to vary and they make it possible to equalize the load on each of the three axles.

In FIG. 13 a rear pneumatic spring assembly 50b is composed of two relatively telescopic tubes 70 and 71 which cooperate to form a pneumatic chamber 72. The uppermost tube 70 is connected by a bracket 74 and pivot member 75 with the rear extension 48 of the load carrying deck 45. The lowermost tube 71 is connected by a pivot member 76 and bracket 77 with the rear yoke 20. In a similar manner 51b indicates a front spring assembly comprising two relatively telescopic tubes 93 and 95 which cooperate to form a pneumatic chamber 94. The uppermost tube 93 is connected by a pivot member 92 and a bracket 91 with the front extension 49 of the load carrying deck 45. The lowermost tube 95 is connected by a pivot member 96 and bracket 97 with the front yoke 21.

The pneumatic spring assembly 50b is connected by a flexible conduit 80, valve 78 and conduit 81 with a compressed air reservoir 82. A rear-spring pressure gauge 73 communicates with the flexible conduit 80 and, preferably, an exhaust control device 79 is connected with the valve 78. Similarly the front pneumatic spring assembly 51b is connected by a flexible conduit 89, a valve 87, and a conduit 86 with the compressed air reservoir 82. A front-spring pressure gauge 90 is connected with the flexible conduit 89 and an exhaust control device 88 is connected with the valve 87.

The compressed air reservoir 82 is connected by a conduit 83 with a driven air compressor 84. The compressor 84 takes in air through an air inlet control device 85 and delivers air under pressure to the reservoir 82. Obviously bladder type pneumatic bags of a conventional form well known in truck and bus suspensions can be used in place of the pneumatic units 50b and 51b.

In using the adjustable spring means disclosed in FIG. 13 the valves 78 and 87 are moved to communicatively connect the reservoir 82 with the spring units 50b and 51b for the purpose of increasing the pressure in said spring units enough to take care of a given cargo load. The gauges 73 and 90 indicate when the desired pressure has been attained. The pressure is maintained by closing the valves 78 and 87. If the cargo load is reduced said valves are opened to exhaust and pressure in units 50b and 51b reduced enough to compensate for the load reduction.

FIG. 14 shows one advantageous way of combining a mechanical and a pneumatic spring device for use with this vehicle. Said FIG. 14 shows a helical compression spring 98 disposed within the telescopic tubes 71 and 70 of the pneumatic spring unit 50b of FIG. 13, and it will be understood that a similar helical compression spring will be provided within the spring unit 51b. Preferably each helical compression spring, such as spring 98, is designed so that it will take care of one half of the sprung weight, which in FIGS. 1 and 2 would be the load carrying platform 45 and prime mover 47, and the pressure in each pneumatic spring unit is adjusted to take care of one half of any added cargo weight or load.

FIG. 15 illustrates an application of knuckle-joint steering to this vehicle. The use of this knuckle-joint type steering means allows the axles and wheels to be placed closer together and this improves the soil bridging effect of the wheels. However, it does not allow complete rolling contact steering movement of the wheels when the vehicle is static. Also it is not adaptable to this vehicle when the differential axle drive shown in FIG. 11 is to be used thereon.

FIG. 15 shows the two cylinders 35 and 40 of FIG. 12 applied to a vehicle in which six wheels 34b are positioned closer together than are the wheels 34, shown in the proceeding figures. In said FIG. 15 the two rear wheels 34b are respectively pivotally connected for steering purposes with the two end portions of a non-rotatable rear axle 30b by crank shaped knuckle-joint steering arms 111 and 107. The two front wheels 34b are similarly pivotally connected for steering purposes respectively with the two end portions of a non-rotatable front axle 32b by crank shaped knuckle-joint type steering arms 104 and 106. Each steering arm 111 and 104 is forked to provide a forwardly extending part and a rearwardly extending part. The rear cylinder 35 is connected by a pivot member 38a with the rear axle 30b. The piston rod 37 of the cylinder 35 is connected by a pivot member 101 with the rearwardly extending part of the steering arm 111. The forwardly extending part of the steering arm 111 is connected by a pivot 110 with one end of a tie rod 109. The other end of the tie rod 109 is connected by a pivot 108 with the steering arm 107. In a similar manner the front cylinder 40 is connected by a pivot member 43a with the front axle 32b and the piston rod 42 of said front cylinder 40 is connected by a pivot 102 with the forwardly extending part of the forked front steering arm 104. The rearwardly extending part of the forked front steering arm 104 is connected by a pivot 103 with one end of a tie rod 100 and the other end of the tie rod 100 is connected by a pivot 105 with the steering arm 106.

As previously explained, the piston rods 37 and 42, in the FIG. 15 construction, will be simultaneously moved equal distances in the same direction by hydraulic pressure from the master cylinder 64 and this will angularly move the two front wheels 34b and the two rear wheels 34b in the proper manner for steering the vehicle.

The foregoing description and accompanying drawings clearly disclose preferred embodiments of my invention but it will be understood that this disclosure is merely illustrative and that changes may be made within the scope of the following claims.

I claim:

1. A three-axle vehicle comprising two end to end adjoining frame yokes; intermediate axle means transverse to said frame yokes pivotally connecting the adjoining ends of said frame yokes; a load carrying deck positioned in spaced relation above said frame yokes and having downwardly extending side flanges pivotally mounted on said intermediate axle means; two resilient compression units spaced forwardly and rearwardly from said intermediate axle means and interposed between the respective frame yokes and parts of the load carrying deck which overhang said frame yokes; two axles pivotally connected with the outer end portions of said frame yokes for torsional movement about the longitudinal axes of said frame yokes and for steering movement about a vertical axis normal to and intersecting said longitudinal axes, said axles extending in opposite transverse directions from the respective frame yokes; and a wheel on each outer end portion of said intermediate axle means and each outer end portion of each of said axles.

2. A three-axle vehicle comprising two end to end adjoining frame yokes; intermediate axle means transverse to said frame yokes pivotally connecting the adjoining ends of said frame yokes and extending in opposite directions from said yokes, the axis of said intermediate axle means coinciding with the horizontal medial planes of said yokes; a load carrying deck positioned above said frame yokes; downwardly extending rigid side flanges on said load carrying deck pivotally mounted on said intermediate axle means; two extension members rigid with said load carrying deck and extending forwardly and rearwardly therefrom in spaced relation above the respective frame yokes; resilient compression units spaced forwardly and rearwardly from said intermediate axle means and interposed between the respective frame yokes and the outer end portions of said extension members and cooperating with the yokes and the extension members in forming spring suspension means; two axles pivotally connected with the outer end portions of said frame yokes for torsional movement about the longitudinal axes of said frame yokes and for steering movement about a vertical axis normal to and intersecting said longitudinal axes, said last mentioned axles extending transversely in opposite directions from the respective frame yokes; and a wheel on each outer end portion of said intermediate axle means and on each outer end portion of each of said last mentioned axles.

3. A three-axle vehicle comprising two end-to-end adjoining frame yokes; intermediate axle means transverse to said frame yokes pivotally linking the adjoining ends of said frame yokes and extending in opposite directions from said yokes, the axis of said intermediate axle means coinciding with the horizontal medial planes of said yokes; two axles pivotally connected with the outer end portions of the respective frame yokes for torsional movement about the longitudinal axes of said frame yokes and for angular steering movement about a vertical axis normal to and intersecting said longitudinal axes, said axles extending transversely in opposite directions from the respective frame yokes; wheels on said intermediate axle means and said axles; a load carrying deck positioned in spaced relation above said frame yokes and extending longitudinally of the vehicle across said intermediate axle means and pivotally connected with said intermediate axle means; and at least one resilient compression unit interposed between each frame yoke and an end portion of the load carrying deck, each resilient compression unit being spaced from the intermediate axle means a distance equal to substantially two thirds of the distance between said intermediate axle means and one of said axles, whereby equal load distribution on said intermediate axle means and each of said axles is attained when one half of the weight of said load carrying deck is supported by each resilient compression unit.

4. A three-axle vehicle comprising two end-to-end adjoining hinged together longitudinally extending frame yokes; intermediate axle means transverse to said frame yokes, the hinged together frame yokes being connected to said axle means for movement about an axis coincident with the axis of said intermediate axle means; a load carrying deck positioned in spaced relation above and overhanging said frame yokes and supported for pivotal movement on an axis coincident with the axis of said intermediate axle means; two variable strength resilient compression units spaced forwardly and rearwardly from the axis of said intermediate axle means and interposed between the respective frame yokes and parts of the load carrying deck which overhang said frame yokes, each variable strength resilient compression unit including means for adjustment to compensate for cargo load variation; two axles pivotally connected with the outer end portions of said frame yokes for torsional movement about the longitudinal axes of said frame yokes and for steering movement about a vertical axis normal to and intersecting said longitudinal axes; and a wheel on each outer end portion of said intermediate axle means and each outer end portion of each axle.

5. The apparatus as claimed in claim 4 in which two resilient compression units of predetermined constant strength substantially sufficient to compensate for the constant weight of said deck and vehicle parts carried thereby are provided in connection with the respective variable strength adjustable resilient compression units.

References Cited in the file of this patent

UNITED STATES PATENTS

| | | |
|---|---|---|
| 814,780 | Grosshauser | Mar. 13, 1906 |
| 1,124,079 | Wagner | Jan. 5, 1915 |
| 1,699,877 | Clark | Jan. 22, 1929 |
| 1,728,890 | Kemble | Sept. 7 1929 |
| 2,906,358 | Tucker | Sept. 29, 1959 |
| 2,918,292 | Carmichael et al. | Dec. 22, 1959 |

FOREIGN PATENTS

| | | |
|---|---|---|
| 622,749 | Germany | July 20, 1938 |
| 951,483 | France | Apr. 18, 1949 |